July 9, 1929.   A. H. LEIPERT   1,720,485
SEAT FOR VEHICLES
Filed April 5, 1924   2 Sheets-Sheet 1
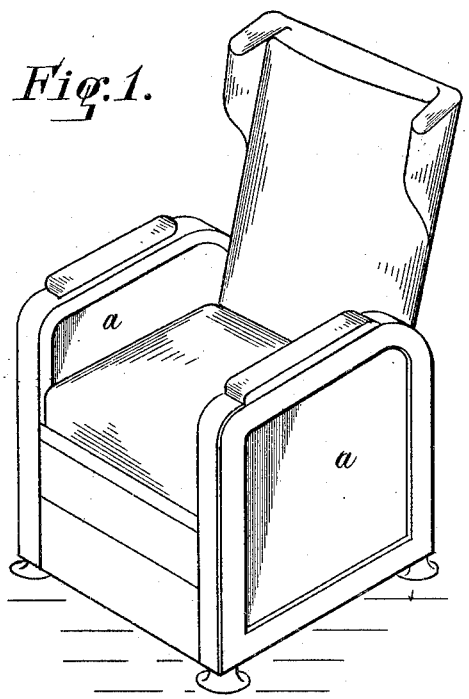
Fig. 1.
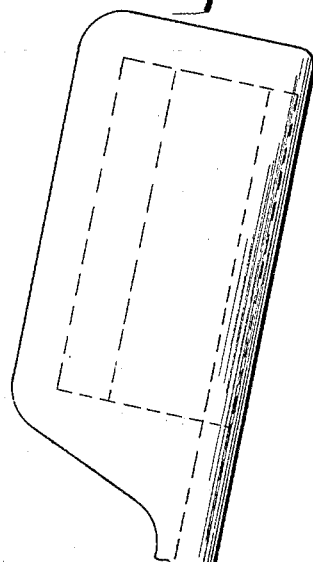
Fig. 2.
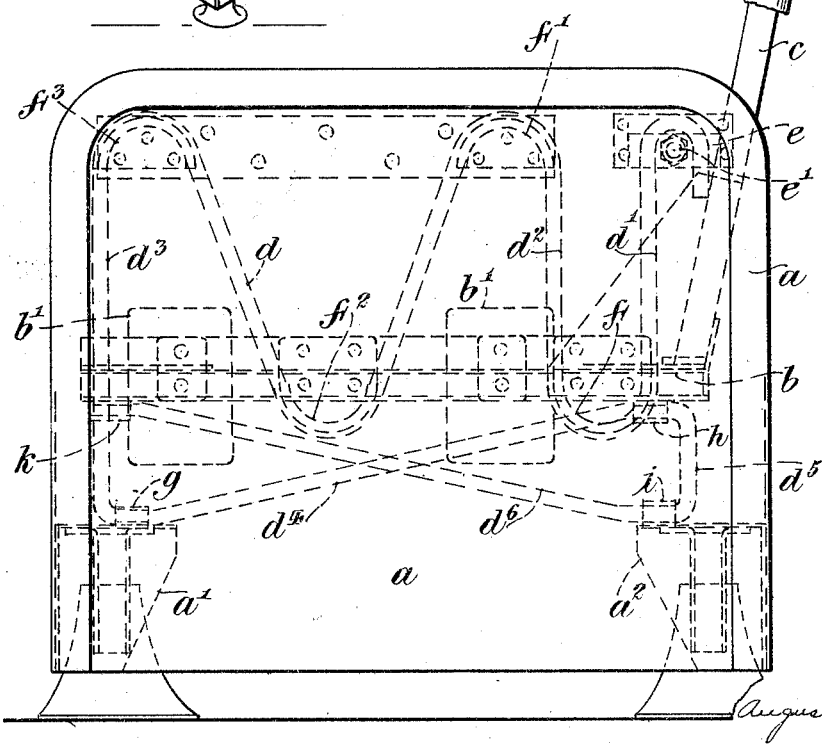
INVENTOR
August H. Leipert
BY
Redding, Greeley, O'Shea & Campbell
ATTORNEYS

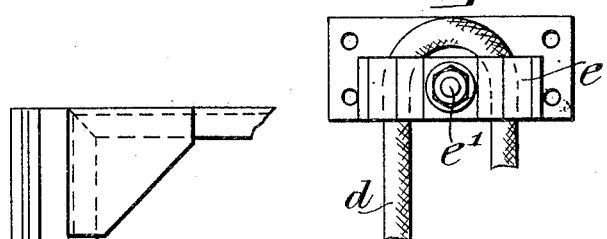
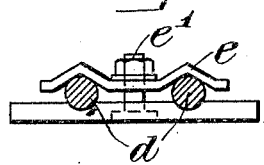
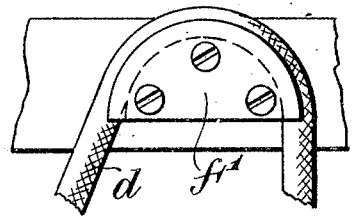
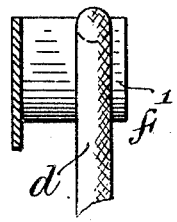
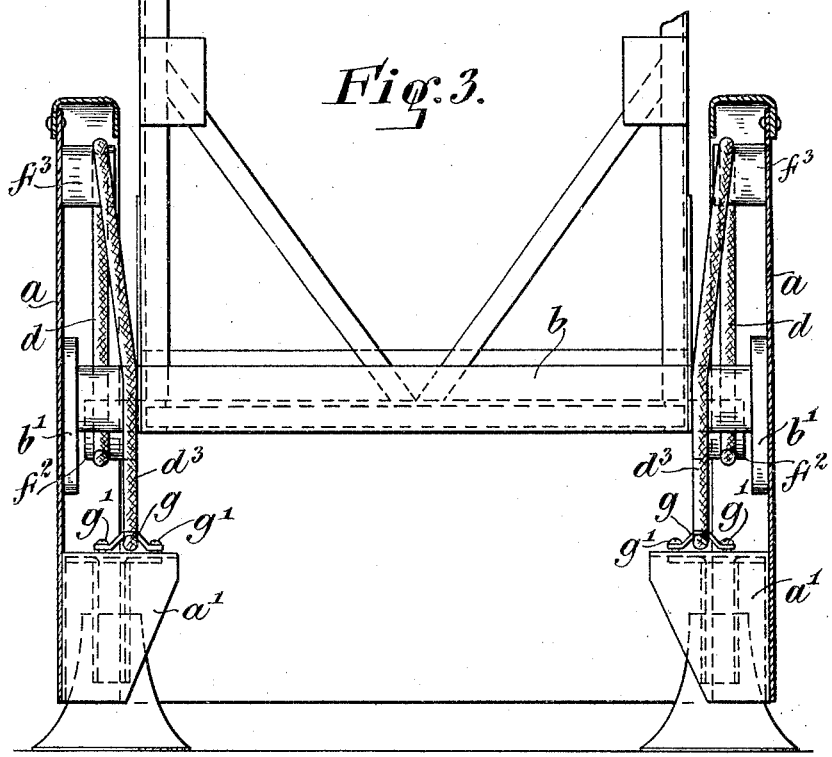

Patented July 9, 1929.

1,720,485

UNITED STATES PATENT OFFICE.

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE.

SEAT FOR VEHICLES.

Application filed April 5, 1924. Serial No. 704,307.

This invention relates to an improved construction and suspension of seats for vehicles and is designed with particular reference to seats for motor vehicles such as busses which may be subjected to road shocks. The principal object of the invention is to provide non-metallic yielding suspension means for the seat frame thereby eliminating the use of metallic or similar spring elements and providing a simple and inexpensive construction easy of assembly and readily accessible for repair or replacement. Still another object of the invention is to mount as a unit the back and seat frames by the improved devices to the end that these frames will have no relative movement with respect to one another such as might cause discomfort to the occupant and injury to his clothing. More particularly, the invention provides for the suspension of a seat on its frame through the intermediary of yielding cords which may be, for instance, of the type now commonly known as aeroplane cords. Such cords are of stranded silk and rubber and have ample mechanical strength for the load to be suspended and yet are non-metallic and yielding to insure proper riding qualities. The simplicity and cheapness of the construction results, in part, from the fact that the seat and frame being formed as a unit separate from the supporting base are connected thereto by passing the non-metallic yielding suspension elements from one to another, the connecting strands being suitably anchored. In the preferred embodiment it has been found expeditious to employ a single endless strand at each side of the seat as a connecting element anchoring only the ends of this strand while passing it at intermediate points over and around blocks or clamps or the like carried, respectively, with the seat and with the frame. At desired points clamps are employed while at other points free engagement may be effected, the result being that movement of the seat to the desired extent and in the desired planes is yieldingly permitted while excessive movement thereof in any direction is effectively but yieldingly snubbed.

The invention will be described more particularly in connection with the embodiment shown in the drawings, wherein:

Figure 1 is a view in perspective of a vehicle seat embodying the invention.

Figure 2 is a view on a somewhat larger plane in side elevation thereof indicating particularly the form of the seat frame and the disposition of the supporting cords with respect thereto.

Figure 3 is a fragmentary view, partly in transverse section and partly in elevation, showing the relation of the unitary seat and back frames to the base and the arrangement of supporting cords.

Figures 4-7 are fragmentary detailed views of suitable connections for the cord.

The invention is not concerned with the particular nature of the seat since it may have any desired form or finish and may indeed be in the nature of a couch or bed without departing from the spirit of the invention. The drawings are intended merely to illustrate a conventional type of single seat adapted for use in motor busses and in which side supporting frames $a$ rest on the floor of the vehicle and a seat frame $b$ and back frame $c$ which comprise a unitary structure are to be mounted on the side frames $a$ in such a manner as will support the occupant comfortably. The principal object of the present invention is to effect this connection by non-metallic means which are simple and inexpensive and facilitate the assembling of parts and possess the advantage of adequate mechanical strength with yielding properties to insure comfort and the absence of such objections as are often found in metallic connections such as wear, noise and expense. It will be evident that where the seat frame $b$ and back frame $c$ are formed as a unitary section and then supported yieldingly on the side frames $a$ the passenger will be carried with the utmost comfort since no relative movement between the parts $b$ and $c$ is possible and no resultant disarrangement of clothing may ensue.

The invention is not to be limited to the particular means by which the suspension elements are made useful in the combination illustrated and the following description is given merely by way of illustration of one way of using non-metallic yielding cords for the support of the seat frame. Referring now to the cord used at one side of the seat a single long strand $d$ of cord having adequate mechanical strength and yielding properties may be employed. Such a cord is found commercially in the so-called aeroplane cord. One end may be clamped at the rear upper side of the inner surface of the side frame $a$ by any suitable clamping device illustrated as a plate $e$ retained by a bolt $e'$. From this anchorage the cord is passed around a curved seat secured to the side of the seat frame $b$ which may be in the form of a semi-circular block $f$. From thence the cord may be passed upwards over a similar curved block $f'$ which is also secured to the inner face of the side frame $a$ near its upper edge. The lengths of cord $d'$, $d^2$, respectively, between the clamp $e$ and the block $f$ and between the block $f$ and the block $f'$ are preferably disposed vertically. From the block $f'$ the cord is passed downwardly under a similar block $f^2$ secured on the side of the seat frame $b$. From thence the cord may pass upwardly over a similar block $f^3$ near the upper and front edge of the side frame $a$ but also on the inner face thereof. From the block $f^3$ a length $d^3$ of the cord passes directly downwardly in a vertical plane to a point of anchorage on a bracket $a'$ to which the side frame $a$ is secured. The anchorage on this bracket may be effected by a strap $g$ retained by screws $g'$. From the clamp $g$ a length $d^4$ of the cord is extended upwardly and rearwardly and led to a point near the rear edge of the seat frame $b$ where it is secured on the underside by a clamp $h$. A length $d^5$ of the cord may be carried directly downwardly from the seat frame $b$ to a bracket $a^2$ which supports the side frame $a$ at its rear edge, where such length is secured to the bracket by means of a clamp $i$. From the clamp $i$ a length $d^6$ of the cord is led forwardly and upwardly and secured to the underside of the seat frame $b$ at a point adjacent its forward edge by means of a clamp $k$. This clamp may be attached at the end of the cord $d$.

From the description given the uses and advantages of the improved suspension should be apparent. The seat frame $b$ carrying the back frame $c$ is supported yieldingly by the vertical lengths of cord extending between the side frame $a$ and the seat in the manner described, two of the intermediate lengths $d'$, $d^2$, being disposed vertically near the rear of the side frame in the belief that the bulk of the weight will be applied at about that point. Front and rear movements of the seat are resisted yieldingly by the inclined lengths $d^4$, $d^6$. Any tendency for vertical movements are snubbed by the lengths $d^3$, $d^5$. It may be advisable to assemble the parts with the cord under tension, that is, subject to an internal static load. Subsequent adjustment of its length or tension may be readily effected through the various clamps $e$, $g$, $h$, $i$ and $k$. Any lateral movement of the seat frame $b$ may be resisted directly by means of side plates $b'$ which bear against the side frames $a$.

As pointed out hereinbefore, the invention is not to be limited to the particular type of frame supported so long as the general requirements are as described. Modifications in the details of connections may be made as desired.

What I claim is:

1. In combination with a frame for the support of an occupant, a supporting frame therefor, non-metallic yielding cords and means connecting lengths of said cords operatively with the two frames to resist relative vertical movements of the frame member under tension, and means for connecting other lengths of the cords to resist relative fore and aft movements of the frame under tension.

2. In combination with a seat frame and side frames for its support, non-metallic yielding connections therebetween comprising a non-metallic yielding cord, means engaging lengths of the cords with the respective side frames and with the seat frame at its opposite sides, said cords being disposed generally in vertical planes and engaged with the parts, certain of the lengths resisting, under tension, movements of the seat frame upwardly and others the movement thereof downwardly.

3. In combination with side frames, a seat frame disposed therebetween, lengths of flexible cord connected to the side frame and to the seat frame at each side thereof to support the latter yieldingly, means for clamping one end of each of said lengths to a side frame for anchoring thereto, blocks carried by the side and seat frames, respectively, said lengths being passed freely over the blocks of the respective sides and means for anchoring the lengths intermediate their ends to the side and seat frames whereby individual lengths will resist under tension certain movements of the seat frame.

This specification signed this 2nd day of April, A. D. 1924.

AUGUST H. LEIPERT.